United States Patent
Cho et al.

(10) Patent No.: US 12,229,534 B2
(45) Date of Patent: Feb. 18, 2025

(54) APPARATUS AND METHOD FOR DEVELOPING NEURAL NETWORK APPLICATIONS

(71) Applicant: ELECTRONICS AND TELECOMMUNICATIONS RESEARCH INSTITUTE, Daejeon (KR)

(72) Inventors: Chang-Sik Cho, Daejeon (KR); Jae-Bok Park, Daejeon (KR); Kyung-Hee Lee, Daejeon (KR); Ji-Young Kwak, Daejeon (KR); Seon-Tae Kim, Daejeon (KR); Ik-Soo Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 102 days.

(21) Appl. No.: 18/098,402

(22) Filed: Jan. 18, 2023

(65) Prior Publication Data
US 2023/0315402 A1 Oct. 5, 2023

(30) Foreign Application Priority Data
Apr. 1, 2022 (KR) .................. 10-2022-0041217

(51) Int. Cl.
G06F 9/44 (2018.01)
G06F 8/10 (2018.01)
G06F 8/35 (2018.01)
G06N 3/10 (2006.01)

(52) U.S. Cl.
CPC ............... *G06F 8/35* (2013.01); *G06F 8/10* (2013.01); *G06N 3/10* (2013.01)

(58) Field of Classification Search
CPC ...................................................... G06F 8/35
USPC ................................................... 717/104
See application file for complete search history.

(56) References Cited

U.S. PATENT DOCUMENTS

| | | | |
|---|---|---|---|
| 10,380,498 B1* | 8/2019 | Chaoji | G06N 7/01 |
| 11,029,819 B2 | 6/2021 | Gerges et al. | |
| 2012/0191630 A1* | 7/2012 | Breckenridge | G06N 20/00 706/12 |
| 2020/0167655 A1 | 5/2020 | Park | |
| 2021/0089904 A1 | 3/2021 | Chung et al. | |

(Continued)

FOREIGN PATENT DOCUMENTS

KR  10-2020-0113995  10/2020

*Primary Examiner* — Evral E Bodden
(74) *Attorney, Agent, or Firm* — KILE PARK REED & HOUTTEMAN PLLC (57) ABSTRACT

Disclosed herein are an apparatus and method for developing a neural network application. The apparatus includes one or more processors and executable memory for storing at least one program executed by the one or more processors. The at least one program receives a target specification and an application specification including user requirements, searches for a neural network model corresponding to the target specification and the application specification in a database, builds an inference engine for performing a neural network operation used by the neural network model, and generates a target image for executing the neural network model to be suitable for a target device using the inference engine.

14 Claims, 4 Drawing Sheets

(56) References Cited

U.S. PATENT DOCUMENTS

2023/0161568 A1* 5/2023 Kim ...................... G06N 20/00
717/106

* cited by examiner

APPARATUS AND METHOD FOR DEVELOPING NEURAL NETWORK APPLICATIONS

CROSS REFERENCE TO RELATED APPLICATION

This application claims the benefit of Korean Patent Application No. 10-2022-0041217, filed Apr. 1, 2022, which is hereby incorporated by reference in its entirety into this application.

BACKGROUND OF THE INVENTION

1. Technical Field

The present disclosure relates generally to Artificial Intelligence (AI) technology based on a neural network, and more particularly to neural network application development technology in which neural network model development technology and neural network deployment technology are integrated.

2. Description of the Related Art

Neural-network-based AI technology is being actively researched both in the country and abroad, and the application range thereof is expanding in various fields, such as factory AI, medical AI, financial AI, autonomous vehicles, unmanned vehicles, and the like.

Development of a neural network application includes a process of developing a neural network model and a process of deploying the same in a target environment in which the developed neural network is to operate. Development of a neural network model requires expertise in neural network theory in the process of making code using neural network functions in order to generate a neural network graph and the process of training neural network parameters, and experts called 'Machine Learning (ML) scientists' are in charge of this process. Because development of a neural network model requires both knowledge on the industrial domain in which a neural network application runs and expertise in AI for forming a neural network graph, this makes it difficult to apply AI in industries.

In a neural network deployment process, it is important to meet the performance requirement of a target in which a neural network is to be executed, and deployment optimized for the target having various hardware acceleration conditions is required. Deployment requires optimization for acceleration of a neural network in a cloud environment, an on-device environment having various acceleration conditions, a distributed environment in which an edge interworks with edge devices, a collaboration environment in which various sensor devices interwork with each other, and the like and also requires advanced technical know-how for installation in devices. Here, experts called 'ML engineers' are in full charge of this work. Also, an environment in which a trained neural network finally performs inference becomes more diverse, and thus deploying the developed neural network requires a lot of time and efforts. So far, there has been no great difficulty in deployment, because it is usually performed in a cloud environment of Amazon, Google, and the like, but the deployment environment is complicated and includes not only various hardware environments, such as an edge cloud, an on-device environment, and the like, but also a distributed environment, a multi-device collaborative environment, and the like. Accordingly, a lot of time and efforts are required for deployment of a neural network as well as generation thereof, which makes it more difficult to apply a neural network in industrial domains.

That is, an application to which an AI neural network is applied is configured with training and inference processes, and experts for the training process differ from experts for a deployment process for inference. That is, experts in each of the two fields are required. Because neural network development requires not only knowledge on the industrial domain but also expertise in neural networks, when an AI service is developed in the industrial domain, a lack of knowledge on the neural network causes difficulty in development.

Meanwhile, U.S. Pat. No. 10,380,498, titled "Platform services to enable one-click execution of the end-to-end sequence of modeling steps" discloses an apparatus and method for generating a learning model by selecting features and parameters based on a similarity score that is determined by comparing a model requirement of a user with previously stored model requirements of multiple users.

SUMMARY OF THE INVENTION

An object of the present disclosure is to support a search for a neural network that meets user requirements and automatic generation of a neural network application in order to support easy development of a neural network application in an industrial field in which there is a lack of expertise in AI.

Another object of the present disclosure is to propose an integrated development system that supports optimal deployment of a neural network application in an onboard environment having various AI acceleration conditions, including a Central Processing Unit (CPU), a Graphics Processing Unit (GPU), a Neural Processing Unit (NPU), and the like, and in a distributed and collaborative operational environment based on an edge cloud.

A further object of the present disclosure is to solve complicated and difficult problems, such as neural network model development, training of a neural network, a process of repeated application of various optimization techniques for adaptation to a target environment and error verification, analysis of a reason for performance degradation, and the like.

In order to accomplish the above objects, an apparatus for developing a neural network application according to an embodiment of the present disclosure includes one or more processors and executable memory for storing at least one program executed by the one or more processors. The at least one program may receive a target specification and an application specification including user requirements, search for a neural network model, corresponding to the target specification and the application specification, in a database, build an inference engine for performing a neural network operation used by the neural network model, and generate a target image for executing the neural network model to be suitable for a target device using the inference engine.

Here, the target specification may include information about an environment in which an inference engine for executing the neural network model operates after the neural network model is deployed in the target device and information about hardware specifications of the target device.

Here, the application specification may include information about accuracy and execution speed of a neural network model acceptable by a neural network application.

Here, the at least one program may limit a neural network search space required for searching for a neural network model in the database by performing a search for a backbone architecture.

Here, the at least one program may set restrictions for a neural network search using the target specification and set a search termination condition for terminating the neural network search using the application specification.

Here, the at least one program may search for the neural network model until the restrictions and the search termination condition are satisfied.

Here, the at least one program may perform optimization such that the found neural network model operates within a preset accuracy range corresponding to the performance limit of the target device based on the target specification and the application specification.

Here, the at least one program may deploy the target image in a manner corresponding to the target device based on the target specification.

Also, in order to accomplish the above objects, a method for developing a neural network application, performed by an apparatus for developing a neural network application, according to an embodiment of the present disclosure includes receiving a target specification and an application specification including user requirements, searching for a neural network model corresponding to the target specification and the application specification in a database, building an inference engine for performing a neural network operation used by the neural network model, and generating a target image for executing the neural network model to be suitable for a target device using the inference engine.

Here, the target specification may include information about an environment in which an inference engine for executing the neural network model operates after the neural network model is deployed in the target device and information about hardware specifications of the target device.

Here, the application specification may include information about accuracy and execution speed of a neural network model acceptable by a neural network application.

Here, the method may further include limiting a neural network search space required for searching for a neural network model in the database by performing a search for a backbone architecture.

Here, searching for the neural network model may comprise setting restrictions for a neural network search using the target specification and setting a search termination condition for terminating the neural network search using the application specification.

Here, searching for the neural network model may comprise searching for the neural network model until the restrictions and the search termination condition are satisfied.

Here, searching for the neural network model may comprise performing optimization such that the found neural network model operates within a preset accuracy range corresponding to the performance limit of the target device based on the target specification and the application specification.

Here, generating the target image may comprise deploying the target image in a manner corresponding to the target device based on the target specification.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

The present disclosure will be described in detail below with reference to the accompanying drawings. Repeated descriptions and descriptions of known functions and configurations that have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present disclosure will be described in detail with reference to the accompanying drawings.

Figure 1:
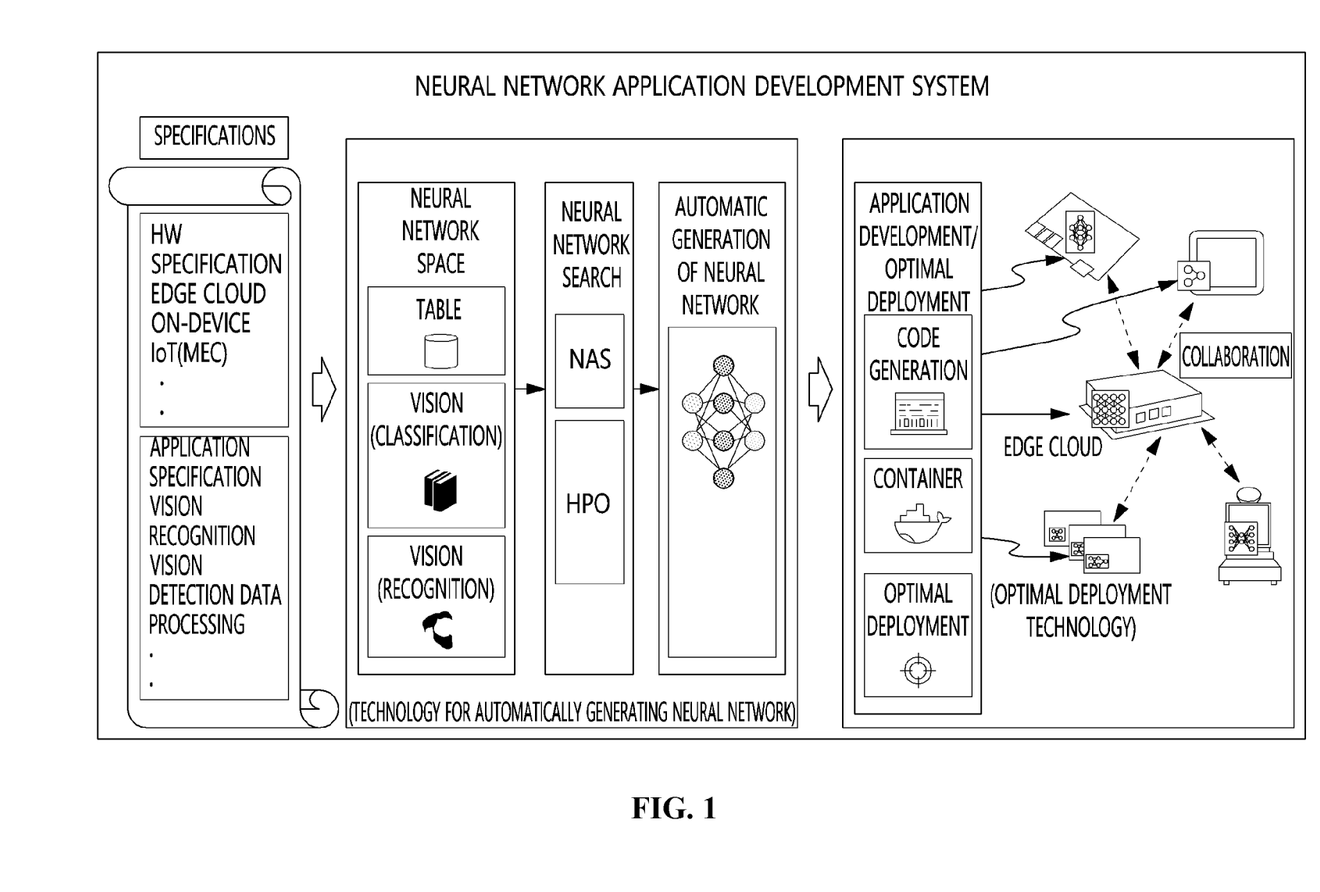
FIG. 1 is a view illustrating a system for developing a neural network application according to an embodiment of the present disclosure.

FIG. 1 is a view illustrating a system for developing a neural network application according to an embodiment of the present disclosure.

Referring to FIG. 1, it can be seen that a system for developing a neural network application according to an embodiment of the present disclosure is illustrated.

The system for developing a neural network application includes the process of generating a neural network model and the process of deploying the generated neural network in an actual target environment.

Here, it can be seen that the process of generating a neural network application and the process of deploying the same are integrated in the system for developing a neural network application.

In the process of generating a neural network application, automatic generation of a neural network is performed simultaneously with optimization of the neural network for adaptation to a target environment. In a conventional method, after the process of generating a neural network, an optimization process is performed separately therefrom in consideration of a target environment in which the neural network is to be deployed, but the present disclosure combines generation of a neural network with optimization thereof in the neural network generation step. That is, a search for a neural network, hyperparameter optimization, and a neural network optimization technique are organically combined, and the search for a neural network is repeatedly performed until the accuracy and performance conditions are satisfied. Because such a repeated process is automatically performed without user intervention, intervention by a neural network developer may be minimized. Accordingly, it helps the neural network developers easily developing a neural network as long as they have domain knowledge.

When a user inputs only hardware specifications of a target and specifications of an application to the system for developing a neural network application, the user may form a neural network search space based thereon, and a neural network that meets the input specifications may be automatically searched for.

Here, the system for developing a neural network application may search for a neural network in consideration of the performance of hardware.

Here, the system for developing a neural network application may automatically generate a neural network through a repeated training process, such as hyperparameter optimization.

An automatic search for a neural network has a disadvantage in that it is very time-consuming due to a large amount of calculation. In the present disclosure, the initial neural network search space is limited by performing a search for a neural network backbone, whereby the time taken to search for a neural network is reduced. In the existing systems, an automatic search for a neural network is provided only in a cloud environment having ultra-high-performance hardware, but the present disclosure enables an automatic search even in an edge cloud environment operated with low-specification hardware.

Also, the system for developing a neural network application may optimize a generated neural network for a target environment and deploy the same in the target environment.

The environment in which a neural network is deployed becomes more diverse and includes any of a cloud environment, an on-device environment having various acceleration conditions, a distributed environment in which an edge interworks with edge devices, a collaboration environment in which various sensor devices interwork with each other, and the like. The various deployment environments involve the diversity of a hardware environment in which a neural network operation is performed, an operating system environment, and a hardware acceleration environment, and it is important to meet the performance requirements in the hardware acceleration environment. The present disclosure may automatically build an inference engine corresponding to a neural network operation to adapt to the deployment environment and the hardware acceleration environment, and may generate a target image suitable for the target environment. Therefore, the present disclosure may significantly reduce time and efforts in the deployment process.

The apparatus and method for developing a neural network application according to an embodiment of the present disclosure propose an integrated development system for making it easy to develop and deploy a neural network. The apparatus and method for developing a neural network application according to an embodiment of the present disclosure support a development process and a deployment process in an integrated manner, rather than separating the development process from the deployment process, thereby providing convenience to neural network application developers and improving productivity.

Figure 2:
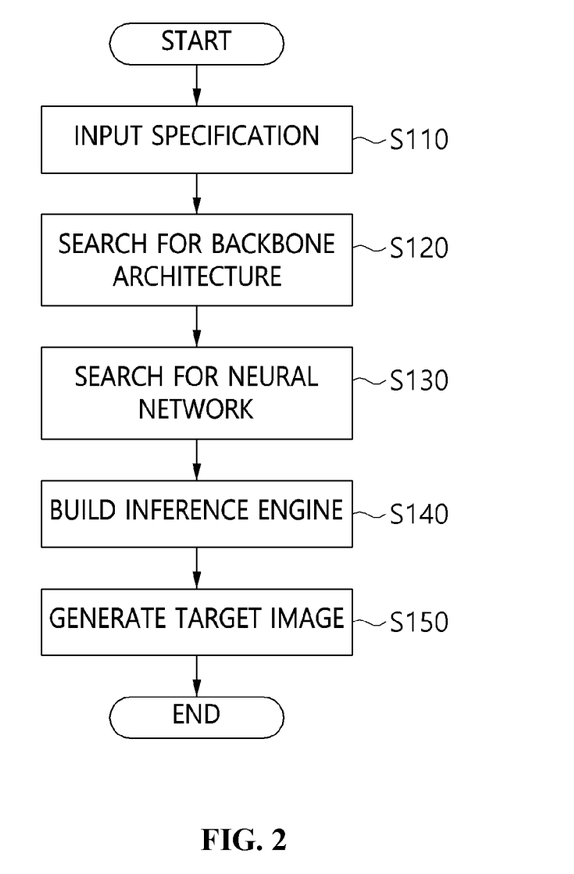
FIG. 2 is a flowchart illustrating a method for developing a neural network application according to an embodiment of the present disclosure.
Figure 3:
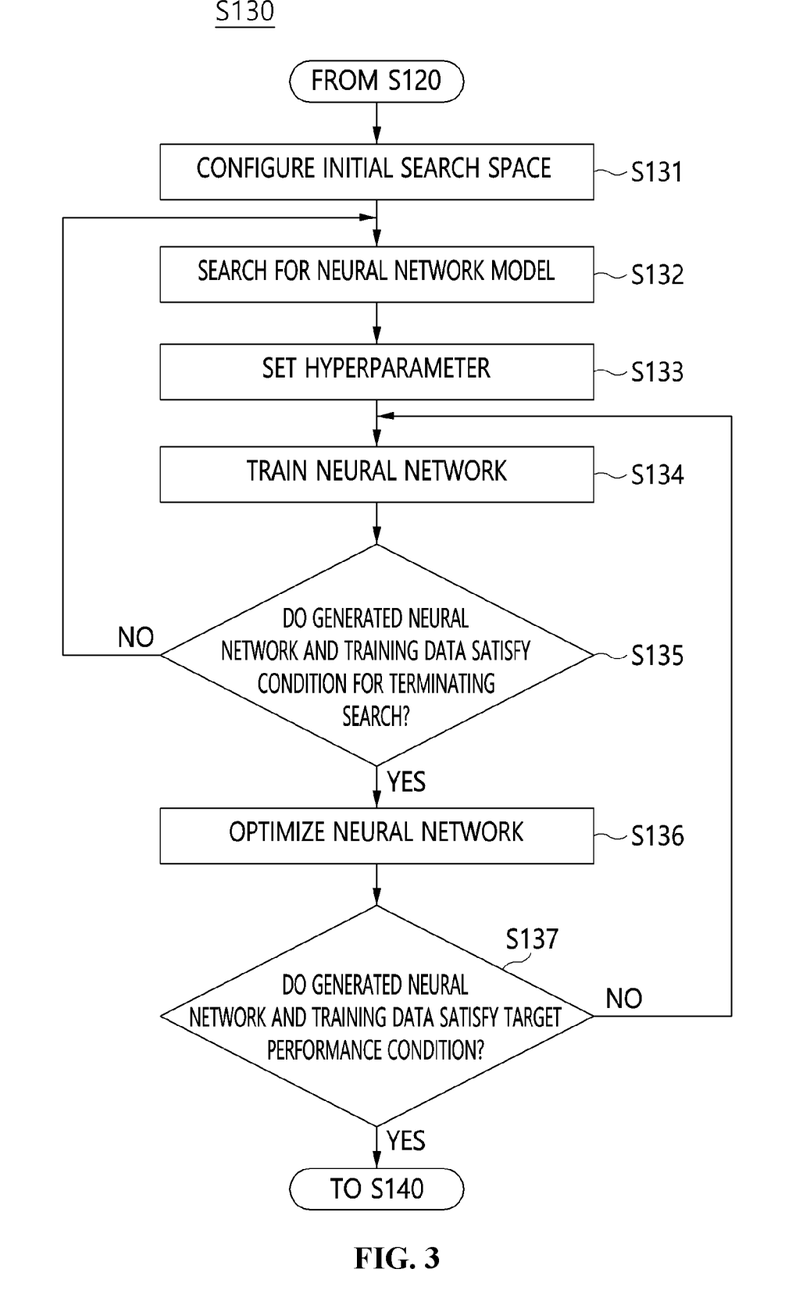
FIG. 3 is a flowchart illustrating in detail an example of the step of searching for a neural network, illustrated in FIG. 2.

FIG. 2 is a flowchart illustrating a method for developing a neural network application according to an embodiment of the present disclosure. FIG. 3 is a flowchart illustrating in detail an example of the step of searching for a neural network, illustrated in FIG. 2.

Referring to FIG. 2, in the method for developing a neural network application according to an embodiment of the present disclosure, first, a target specification and an application specification including user requirements may be received at step S110.

That is, at step S110, a target specification and an application specification including user requirements may be received. In the target specification, environments in which an application is deployed in a target device may be classified into a cloud environment, an edge cloud environment, an on-device environment, a distributed environment, and an collaboration environment.

The target specification may specify an environment in which an inference engine for executing a neural network model operates. When inference is performed in a cloud environment, there is no limitation in the performance of a neural network. However, in an edge cloud or an on-device environment, an operation of a neural network that can be performed may be limited depending on hardware specifications. Therefore, the target specification may be input as a restriction for a search for a neural network.

The target specification is transferred in the form of a YAML Ain't Markup Language (YAML) file. When a neural network is generated, a memory amount, latency, power consumption, and the like specified in the YAML file are considered, and a neural network optimized therefor is generated. In a deployment process, a target image is generated depending on the details specified in the target specification. Here, a target image corresponding to the Operating System (OS) and Central Processing Unit (CPU) specifications specified in the target specification is automatically generated. The generated target image is downloaded to the target, and may then be remotely executed. Here, a process of downloading the target image to the target may be facilitated by generating the target image as a Docker image.

For example, an example of an on-device target specification in which Nvidia Jetson Nano is set as a target according to an embodiment of the present disclosure may be represented as shown in Table 1.

TABLE 1

Type: Ondevice
Subtype: JetsonNano
Vendor: Nvidia
OS: Ubuntu
CPU: ARMA57
GPU: Maxwell
Storage: 64 GB
Memory: 4 GB
Latency: 200 ms
Power: 20 W In the application specification, a neural network application is classified based on the type thereof, and may be classified into types, such as classification, detection, segmentation, and the like.

The application specification provides information required for searching for a backbone architecture, thereby being used to reduce the time taken to search for a neural network. A neural network search is a process that takes a large amount of time, and has a disadvantage in that it is very time-consuming if the search space is not limited. For example, when the neural network search is started without limiting the search space, it may take one year in Graphics Processing Unit (GPU) time.

Also, the application specification may be used as a condition for stopping the neural network search in the neural network search process. The accuracy and execution speed of the neural network acceptable by an application are used for the neural network search, and the neural network search may be continuously performed until the condition is satisfied.

The application specification may also be transferred in the form of a YAML Ain't Markup Language (YAML) file. Various arguments for automatic generation of a neural network may be transferred using the application specification. An example of an application specification for detection may be represented as shown in Table 2. Information about a dataset and the number of pyramids for generating a neural network for class information detection may be included in the specification.

TABLE 2

Type: Detection
DataSet: COCO
DataPath: /dataset/coco
Img: /dataset/Images
Annotation: /dataset/Annotation
Train: /dataset/train.txt
Validation: /dataset/validation.txt
Imagesize: 640*480
NumberofClass: 8
ClassName: 'tiger', 'dog', 'cat', 'horse', 'bus', 'train', 'car', 'airplane'
NumberofPyramid: 3

Also, in the method for developing a neural network application according to an embodiment of the present disclosure, a backbone architecture may be searched for at step S120.

That is, at step S120, a backbone architecture may be searched for in order to reduce the search space for a neural network search.

Here, at step S120, when a user inputs specifications, a neural network is searched for in consideration of a target and an application. Here, because a neural network search is time-consuming, a backbone architecture may be searched for in advance in order to reduce a search space.

Here, at step S120, the search for a backbone architecture is performed, whereby a neural network search space required for searching for a neural network model may be limited in a database.

Here, at step S120, state-of-the-art (SOTA) neural network information that is best for an AI application is managed in the database, and the SOTA neural network for the corresponding application may be recommended based on rules according to the application specification of the user. The recommended SOTA neural network limits the neural network search space in the neural network search, thereby enabling a fast search for a neural network.

Also, in the method for developing a neural network application according to an embodiment of the present disclosure, a neural network may be searched for at step S130.

That is, at step S130, a neural network model corresponding to the input target specification and application specification may be repeatedly searched for in the database.

Here, at step S130, restrictions for the neural network search are set using the target specification, and the condition for terminating the neural network search may be set using the application specification.

Here, at step S130, when the found neural network model meets the specifications, the neural network search is stopped, and the generated neural network model and a neural network training result may be output as the final result of automatic generation of a neural network.

Here, step S130 is automatically performed, whereby the user may generate a neural network model adaptive to the target even though the user lacks expertise in a neural network.

Referring to FIG. 3, at step S130, first, an initial search space may be configured at step S131.

That is, at step S131, a neural network search space is limited to the result of the search for a backbone architecture, whereby the initial search space may be configured.

Also, at step S132, a neural network model may be searched for based on the configured initial search space.

Also, at step S133, hyperparameters may be set in the found neural network model.

Also, at step S134, training may be performed using the neural network model in which the hyperparameters are set.

Also, at step S135, whether the trained neural network model satisfies the condition for terminating the search and whether the accuracy of the neural network satisfies the performance required by an application are checked, and searching for a neural network at step S132, setting hyperparameters at step S133, and training the neural network at step S134 may be repeatedly performed until the restrictions for the neural network search are satisfied.

Also, at step S136, the neural network model may be optimized.

That is, at step S136, when the neural network model and the training data satisfy the level required by an application, the neural network may be optimized in order to make the neural network model operate in the target device in which the neural network is to be deployed.

Here, at step S136, quantization, pruning, and the like may be performed for optimization of the neural network.

Also, at step S137, because the accuracy of the neural network is necessarily decreased through the neural network optimization process, whether the accuracy decreased for performance satisfies application requirements may be checked again.

Here, at step S137, a final neural network that satisfies both the neural network application requirements in the application specification and the hardware specification requirements in the target specification may be generated.

Here, at step S137, optimization is performed such that the found neural network model operates within a preset accuracy range corresponding to the performance limit of the target device based on the target specification and the application specification, and when the performance condition is not satisfied, steps S134 to S136 may be again performed.

Also, in the method for developing a neural network application according to an embodiment of the present disclosure, an inference engine may be built at step S140.

That is, at step S140, when generation and training of the neural network model are completed, an inference engine for operating the generated neural network model may be built.

Here, at step S140, the automatically generated neural network model is used for a neural network operation at a lower tier, and a neural network operation used for the generated neural network model may be selected.

Here, at step S140, a neural network operation used by the neural network model is detected by analyzing the neural network model, and an inference engine for performing the corresponding neural network operation may be built.

Here, the inference engine may also include neural network optimization functions, such as quantization, pruning, and the like.

Also, in the method for developing a neural network application according to an embodiment of the present disclosure, a target image may be generated at step S150.

That is, at step S150, using the inference engine, a target image for executing the neural network model suitably for the target device may be generated.

Here, at step S150, a target image for executing the neural network model suitably for the operating system or the acceleration condition of the actual target device may be generated.

Here, at step S150, the target image may be deployed such that the target device corresponding to the generated target image is able to download the target image.

Here, at step S150, because the operating system and the hardware environment of the development environment do not match the target device on which the final inference system runs, a target image suitable for the target device may be generated and deployed.

Here, at step S150, based on the target specification, the target image may be deployed in a manner corresponding to the target device.

Here, at step S150, the target image may be deployed based on a container or may be deployed using cross-compilation.

Here, at step S150, the target image may be deployed to adapt to any of various environments, such as a distributed environment, and the like.

Figure 4:
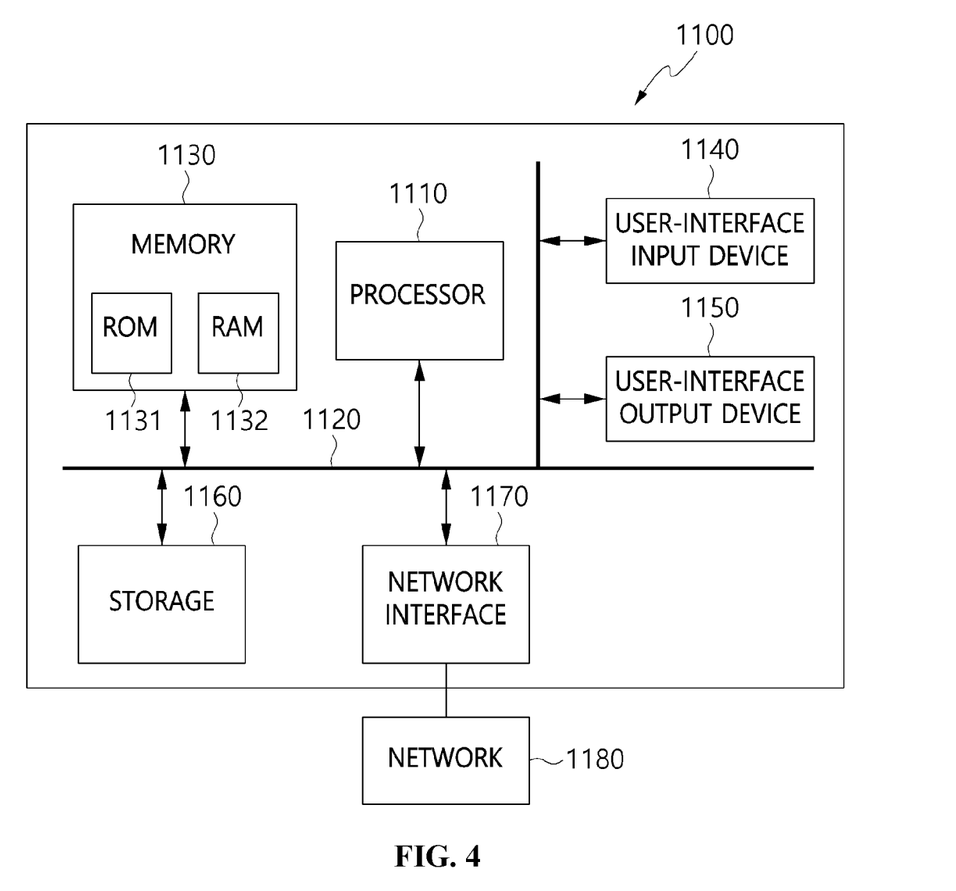
FIG. 4 is a view illustrating a computer system according to an embodiment of the present disclosure.

FIG. 4 is a view illustrating a computer system according to an embodiment of the present disclosure.

Referring to FIG. 4, the apparatus for developing a neural network application according to an embodiment of the present disclosure may be implemented in a computer system 1100 including a computer-readable recording medium. As illustrated in FIG. 4, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include Read-Only Memory (ROM) 1131 or Random-Access Memory (RAM) 1132.

The apparatus for developing a neural network application according to an embodiment of the present disclosure includes one or more processors 1110 and executable memory 1130 for storing at least one program executed by the one or more processors 1110. The at least one program may receive a target specification and an application specification including user requirements, search for a neural network model corresponding to the target specification and the application specification in a database, build an inference engine for performing a neural network operation used by the neural network model, and generate a target image for executing the neural network model to be suitable for a target device using the inference engine.

Here, the target specification includes information about an environment in which the inference engine for executing the neural network model operates after the neural network model is deployed in the target device and information about the hardware specifications of the target device.

Here, the application specification may include information about the accuracy and execution speed of the neural network model acceptable by a neural network application.

Here, the at least one program searches for a backbone architecture, thereby limiting a neural network search space required for searching for the neural network model in the database.

Here, the at least one program may set restrictions for a neural network search using the target specification, and may set a condition for terminating the neural network search using the application specification.

Here, the at least one program may search for the neural network model until the restrictions and the condition for terminating the neural network search are satisfied.

Here, the at least one program may perform optimization such that the found neural network model operates within a preset accuracy range corresponding to the performance limit of the target device based on the target specification and the application specification.

Here, the at least one program may deploy the target image in a manner corresponding to the target device based on the target specification.

The present disclosure may support a search for a neural network that meets user requirements and automatic generation of a neural network application in order to support easy development of a neural network application in an industrial field in which there is a lack of expertise in AI.

Also, the present disclosure may develop an integrated development system that supports optimal deployment of a neural network application in an onboard environment having various AI acceleration conditions, including a Central Processing Unit (CPU), a Graphics Processing Unit (GPU), an Neural Processing Unit (NPU), and the like, and in a distributed and collaborative operational environment based on an edge cloud.

Also, the present disclosure may solve complicated and difficult problems, such as neural network model development, training of a neural network, a process of repeated application of various optimization techniques for adaptation to a target environment and error verification, analysis of a reason for performance degradation, and the like.

As described above, the apparatus and method for developing a neural network application according to the present disclosure are not limitedly applied to the configurations and operations of the above-described embodiments, but all or some of the embodiments may be selectively combined and configured, so the embodiments may be modified in various ways.

What is claimed is:

1. An apparatus for developing a neural network application, comprising:
one or more processors; and
executable memory for storing at least one program executed by the one or more processors,
wherein the at least one program is configured to
receive a target specification and an application specification including user requirements,
limits a neural network search space required for searching for a neural network model in a database by performing a search for a backbone architecture,
search for the neural network model, corresponding to the target specification and the application specification, in the database with the limited neural network search space,
build an inference engine for performing a neural network operation used by the neural network model, and generate a target image for executing the neural network model to be suitable for a target device using the inference engine.

2. The apparatus of claim 1, wherein the target specification includes information about an environment in which an inference engine for executing the neural network model operates after the neural network model is deployed in the target device and information about hardware specifications of the target device.

3. The apparatus of claim 2, wherein the application specification includes information about accuracy and execution speed of a neural network model acceptable by a neural network application.

4. The apparatus of claim 3, wherein the at least one program sets restrictions for a neural network search using the target specification and sets a search termination condition for terminating the neural network search using the application specification.

5. The apparatus of claim 4, wherein the at least one program searches for the neural network model until the restrictions and the search termination condition are satisfied.

6. The apparatus of claim 5, wherein the at least one program performs optimization such that the found neural network model operates within a preset accuracy range corresponding to a performance limit of the target device based on the target specification and the application specification.

7. The apparatus of claim 6, wherein the at least one program deploys the target image in a manner corresponding to the target device based on the target specification.

8. A method for developing a neural network application, performed by an apparatus for developing a neural network application, comprising:
    receiving a target specification and an application specification including user requirements;
    limiting a neural network search space required for searching for a neural network model in a database by performing a search for a backbone architecture;
    searching for the neural network model, corresponding to the target specification and the application specification, in the database with the limited neural network search space;
    building an inference engine for performing a neural network operation used by the neural network model; and
    generating a target image for executing the neural network model to be suitable for a target device using the inference engine.

9. The method of claim 8, wherein the target specification includes information about an environment in which an inference engine for executing the neural network model operates after the neural network model is deployed in the target device and information about hardware specifications of the target device.

10. The method of claim 9, wherein the application specification includes information about accuracy and execution speed of a neural network model acceptable by a neural network application.

11. The method of claim 10, wherein searching for the neural network model comprises setting restrictions for a neural network search using the target specification and setting a search termination condition for terminating the neural network search using the application specification.

12. The method of claim 11, wherein searching for the neural network model comprises searching for the neural network model until the restrictions and the search termination condition are satisfied.

13. The method of claim 12, wherein searching for the neural network model comprises performing optimization such that the found neural network model operates within a preset accuracy range corresponding to a performance limit of the target device based on the target specification and the application specification.

14. The method of claim 13, wherein generating the target image comprises deploying the target image in a manner corresponding to the target device based on the target specification.

* * * * *